United States Patent Office 3,637,592
Patented Jan. 25, 1972

3,637,592
CRYSTALLINE COPOLYKETONE FILM
STRUCTURES
Charles E. Berr, Wilmington, Del., assignor to E. I. du
Pont de Nemours and Company, Wilmington, Del.
No Drawing. Continuation-in-part of application Ser. No.
702,802, Feb. 5, 1968. This application June 10, 1970,
Ser. No. 45,232
The portion of the term of the patent subsequent to
June 23, 1987, has been disclaimed
Int. Cl. C08g 33/10
U.S. Cl. 260—47 R    8 Claims

ABSTRACT OF THE DISCLOSURE

Crystalline copolyketone film structures having the following repeating structural unit

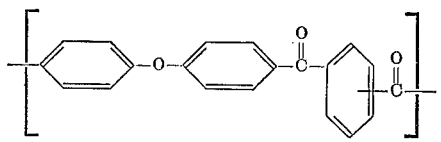

wherein the

moiety is either

(T moiety) or

(I moiety), and the $T:I$ ratio varies from 90:10 to 50:50 are provided; crystallized film structures are useful in a variety of applications, for example, electrical insulation.

THE INVENTION

The present application is a continuation-in-part of copending application Ser. No. 702,802, filed Feb. 5, 1968, now Pat. No. 3,516,966.

The present invention relates to a novel film structure of organic polyketone polymeric material. More particularly, the present invention is directed to a novel film structure of a crystalline copolyketone of diphenyl ether and terephthaloyl and isophthaloyl chloride, and to a process of manufacture therefor.

Polyketones and copolyketones are known polymeric materials and are described in, for example, U.S. Pat. No. 3,065,205 and British patent specification Nos. 971,227 and 1,086,021. There is, however, no disclosure in the prior art of a melt-extruded and crystallized copolyketone film structure of the present invention. This film is characterized by wholly unexpected and unique properties such as, for example, high zero strength temperature, low oxygen and water vapor permeability, good dimensional stability at high temperatures, and flexibility at extremely low temperatures. Accordingly, it is the principal object of the present invention to provide specific crystalline copolyketone film structures having unique and unexpected properties.

According to the present invention, there is provided a film structure of a crystalline copolyketone having the following repeating structural unit:

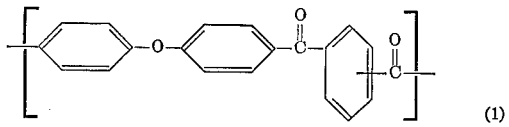

wherein the

moiety is either

(T) or

(I) and the $T:I$ ratio varies from 90:10 to 50:50. The crystalline copolyketone film structure of the present invention is preferably dimensionally stabilized or heat-set. It is further preferable that the crystalline copolyketone film structure be heat-set while held under restraint. The crystalline copolyketone film structure of the present invention is preferably at least about 0.5 mil thick, and may be of a thickness of up to about 20 mils or greater.

The crystalline copolyketone film structure of the present invention is melt-extruded from a copolyketone composition obtained by Friedel-Crafts syntheses such as described in U.S. Pat. Nos. 3,065,205; U.S. 3,441,538 and 3,442,857 or various modifications of such syntheses listed. The copolyketone, after adequate purification for removal of catalyst residues and other impurities, is extruded into film form. The extrusion temperature will vary depending upon the $T:I$ ratio of the copolyketone, and also with its molecular weight (or melt viscosity). Extrusion temperatures from about 10° C. to about 50° C. above the melting point of the copolyketone are satisfactory. Extrusion temperatures towards the lower end of the above range are preferred in order to minimize degradation of the copolyketone, and extrusion temperatures below 400° C. are preferred for this reason. The extrusion temperature will generally fall within the range of about 300° C. to about 400° C. The optimum extrusion temperature will vary depending upon the $T:I$ ratio of the copolyketone, and for the range of $T:I$ ratios under consideration, the extrusion temperature will be higher as the $T:I$ ratio increases or becomes greater. For example, when the $T:I$ ratio is 70:30, a preferred extrusion temperature is between about 360° C. and about 370° C.; and when the $T:I$ ratio is 50:50, a preferred extrusion temperature is between about 330° C. and about 350° C. The extruded copolyketone film structure is quenched against a metal roll or drum in order to preclude crystallization thereof. The quench roll or drum may be either at ambient room temperature, or be cooled, especially at higher film extrusion rates. In such manner, reproducible, consistently amorphous film for use in the process of this invention is obtained.

The amorphous as-cast extruded film structure is then annealed by heat treatment. During this treatment, crystallization occurs, as is evidenced by the X-ray pattern. Operable temperatures are generally in the range of 200 to 350° C., but below the melting point of the copolyketone film structure. Maximum crystallinity is achieved above the temperature of inception of crystallization but below the melting point of the copolyketone film structure. The specific temperature at which maximum crystallinity is achieved for a given copolyketone film structure will be higher as the $T:I$ ratio of the polymer goes higher, for the range of $T:I$ ratios under consideration. For example, for a copolyketone film structure having a $T:I$ ratio of 70:30, maximum crystallinity is achieved at about 275° C., while for a copolyketone film structure having a $T:I$ ratio of 50.50, maximum crystallinity is achieved at about 225° C. The copolyketone film structure can be held at the crystallization temperature for a matter of minutes (1 to 30 min.) if it is desired to develop near to the maximum possible crystallinity, but sufficient crystallinity for good dimensional stability has been developed in copolyketone film structures having a $T:I$ ratio of 70:30 in continuous runs by contacting the film structure for less than 5 sec. with a drum heated at 275° C.

During annealing for the purpose of thermally inducing crystallization, the copolyketone film structure may or may not be held under restraint. For the purpose of achieving the best possible level of physical properties and good sheet flatness, it is important that the film structure be held under restraint and it is preferred to do so. Film thus treated is said to be heat-set. As-cast extruded film which has been annealed under restraint is highly dimensionally stable.

A number of unexpected properties has been discovered in the crystallized films of the present invention. For example, it has been unexpectedly found that the crystalline copolyketone film structure retains excellent electrical properties to above the glass transition temperature, and to a temperature 10° C. to 15° C. higher than the amorphous copolyketone polymer. For example, it is found that for the polymer having a $T:I$ ratio of 70:30 which has a glass transition temperature of about 160° C. to 165° C., amorphous film structures show the first marked increase in the dissipation factor (generally from well below 1% to greater than 1%) in the temperature range of 155° C. to 167° C., while crystalline copolyketone film structures of the invention show the first marked increase in the dissipation factor in the temperature range of 167° C. to 180° C. The significance of this improvement is shown by the fact that the crystalline copolyketone film structures of the invention can be classed in electrical class H while the amorphous film structures are in electrical class F, the next lower rating.

It has been further found that the crystalline heat-set copolyketone film structures of the invention exhibit excellent dimensional stability to temperatures very much higher than do the amorphous film structures. For example, copolyketone film structures having a $T:I$ ratio of 70:30, and which have been annealed and heat-set exhibit substantially no shrinkage upon heating up to a temperature of about 200° C. and only minor shrinkage in the range of 1% to 3% at temperatures to as high as 300° C. to 350° C. In direct contrast, amorphous film structures shrink to the extent of 5% or more at temperatures of 150° C. and higher. Crystalline copolyketone film structures of the present invention characterized by high dimensional stability are highly useful in many applications such as for cook-in-bag food containers.

Another unexpected marked property improvement which appears to be attributable to annealing and crystallization of the copolyketone film structures of the invention is the zero strength temperature. It is observed, for example, that amorphous film structures of the copolyketone having a $T:I$ ratio of 70:30, ahve a zero strength temperature of about 250° C., while crystalline film structures having the same $T:I$ ratio have a zero strength temperature above 300° C., and generally in the range of 325° C. to 350° C.

A significant discovery is that the crystalline copolyketone film structures of the present invention are characterized by totally surprising and unexpected oxygen and water vapor permeability properties. For example, the oxygen permeability of amorphous polyketone film structures having a $T:I$ ratio of 70:30 and a thickness of 1 mil is about 100 cc./24 hr./100 in.$^2$/atm.; whereas, by contrast, crystallization drops the value to about 50 or less. For the same polyketone, water vapor permeability of amorphous film structures of 1 mil thickness is about 200 g./hr./100 m.$^2$; crystallization drops the value to about 75 or less.

The principle and practice of the present invention will now be illustrated by the following examples which are only exemplary thereof and it is not intended that the invention be limited thereto since modifications in technique and operation will be apparent to anyone skilled in the art.

The test samples of film structures of the present invention prepared in the following examples were evaluated in accordance with the following testing procedures:

Inherent viscosity

The inherent viscosity is measured either at 15° C. at a concentration of 0.5% by weight of the polymer in fuming nitric acid or at the same concentration at 23° C. in concentrated sulfuric acid. To calculate inherent viscosity, the viscosity of the polymer solution is measured relative to that of the said acid alone.

Inherent viscosity $$= \frac{\text{natural logarithm} \frac{\text{Viscosity of solution}}{\text{Viscosity of acid solvent}}}{C}$$

where C is the concentration expressed in grams of polymer per 100 milliliters of solution.

Crystallinity index

The crystallinity index (C) for polyketone film is defined as 100 times the ratio of the crystalline coherent X-ray scattering (i.e., the area beneath the total intensity and above the intensity ascribed to the amorphous scattering on a plot of intensity vs. Bragg angle, called Area A) to the total of the crystalline and amorphous coherent X-ray scattering (i.e., the total area beneath the intensity and the background intensity, Area A plus Area B). For example, $$C = \frac{\text{Area } A}{\text{Area } A+B} \times 100$$

This crystallinity index varies with the true percent crystallinity in the film.

The X-ray unit used for measuring crystallinity was built by the General Electric Corporation, Milwaukee, Wisconsin, type XRD–5D1, equipped with the SPG flat sample holder which provides for the support of a flat sample such as a film. The sample is held in such a position so that the plane of the film is parallel to the beam when the detector is at 0°2θ. The sample should be approximately 0 to ⅜ in. thick, ⅞ to 1⅛ in. wide, and any length up to 3 in. It is held by springs against knife edges above and below the X-ray beam.

The sample is mounted on the SPG flat sample holder and the Bragg angle scanned using a motor driven spectrogoniometer. The resulting plot is then used to determine relative crystallinity index.

Zero strength temperature

The zero strength temperature is that temperature at which a film supports a load of 20 lbs./square inch of film cross-sectional area for no more nor less than 5±0.5 seconds. The test is carried out by placing the sample in contact with a heated bar, the proper load being previously applied, and determining the length of time required for failure. This is carried out at various temperatures until the zero strength temperature is determined.

Pneumatic impact strength

Pneumatic impact strength is the energy required to rupture a film reported in kilogram-centimeters/mil of thickness of the film sample. It is determined by measuring the velocity of a ball ½" in diameter weighing 8.3 grams mechanically accelerated by air pressure, first in free flight and then in a flight impeded by rupturing a test film sample 1¾" x 1¾". The velocities are measured by timing photoelectrically the passage of the steel balls between two light beams set a definite distance apart. The pneumatic impact strength is measured by the loss in kinetic energy due to the rupturing of the film sample and is calculated by subtracting the square of velocity in impeded flight from the square of velocity in free flight and multiplying the result by the weight of the projectile divided by the acceleration due to gravity. This test is carried out at 23° C. and 50% relative humidity, and the test samples are conditioned for 24 hours at 23° C. and 50% relative humidity.

Water vapor permeability --- ASTM No. E-96.
Oxygen permeability ------- ASTM No. D-1434-66.
Mit folding endurance ------ ASTM No. D-2176-63T.
Elmendorf tear strength ---- ASTM No. D-1922-67.
Tensile properties (initial modulus, tenacity, elongation); Instron tester ------ ASTM No. D-882-67.
Electrical volume resistivity _ ASTM No. D-257-66.
Dielectric constant (K) and dissipation factor -------- ASTM No. D-150-65T.
Density (gradient tube method) ------------------ ASTM No. D-1505-67.

EXAMPLE 1

A 150-ml. jacketed Hastelloy-C pressure vessel was charged with 8.595 gms. (0.0505 mol) of diphenyl ether, 5.810 gms. (0.0350 mol) of terephthalic acid and 3.045 gms. (0.0150 mol) of isophthaloyl chloride and the vessel was closed. It was then chilled to about −50° C. by cooling in a solid carbon dioxide/acetone bath. By means of stainless steel tubing attached to a valve on the vessel, there were introduced 50 gms. (2.5 mols) of hydrogen fluoride and 40 gms. (0.6 mol) of boron trifluoride from supply cylinders (the amounts being determined by weight difference). In a barricaded area, the vessel was mounted on a rocker table and flexible conduit from a temperature bath was attached to the jacket of the vessel for temperature control. By rocking the vessel, the reaction system was agitated at 0° C. for 0.5 hour, at 30° C. for 1 hour, and finally at 80° C. for 2 hours. The tube was again cooled to 0° C., and the valve opened to permit venting of boron trifluoride. Nitrogen was then introduced into the vessel to a pressure of 100 p.s.i., and the valve was fitted with a fine orifice. The vessel was placed in an inverted position and the contents were sprayed through the orifice into a 1:1 mixture (volume ratio) of pyridine and methanol stirred with a high-shear stirrer. A fine yellow precipitate formed immediately, and was held in the pyridine/methanol mixture overnight. The precipitated polymer was collected by filtration and extracted with pyridine for 48 hours in a Soxhlet extractor. The polymer was washed with methanol and dried under vacuum at 150° C. The polymer had an inherent viscosity of 0.62, measured on a 0.5% by weight solution in concentrated sulfuric acid at 23° C. The polymer was fabricated into transparent film by pressing at 325° C. under 10,000 p.s.i. for one minute. The resulting somewhat brittle film was made tough by annealing in a furnace at approximately 325° C. for 3 minutes.

EXAMPLE 2

Employing the same general procedure as described in Example I, a 150-ml. stainless steel pressure vessel was charged with 8.5 gms. (0.050 mol) of diphenyl ether, 9.135 gms. (0.045 mol) of terephthaloyl chloride, 1.015 gms. (0.005 mol) of isophthaloyl chloride, 40 gms. (2.0 mols) of hydrogen fluoride, and 20 gms. (0.3 mol) of boron trifluoride. While rocking the vessel, it was held at −20° C. for 1 hour, then warmed to 50° C. for 4 hours. The vessel was then cooled to 0° C., and vented to permit boron trifluoride to escape. The residual material was discharged into cold, vigorously stirred methanol. The solid polymer which precipitated was collected by filtration, washed 3 times with methanol, and stored under pyridine overnight. It was then extracted with boiling pyridine in a Soxhlet extractor for two hours. It was extracted 3 times with methanol, 3 times with anhydrous ether, then dried at 60° C. under vacuum at 40 mm. pressure. The polymer had an inherent viscosity of 0.62, measured on a 0.5% by weight solution in concentrated sulfuric acid at 30° C.

Part of the polymeric product was dissolved in concentrated sulfuric acid and reprecipitated by pouring into a 50:50 mixture of methanol and ice. The white polymer which precipitated was washed with water until the filtrate was neutral, was washed with methanol 3 times and with anhydrous ether 3 times, and was dried at 50° C. under vacuum at 40 mm. pressure and then at 220° C. for 2 hours under 1 mm. pressure. The polymer thus purified had an inherent viscosity of 0.84, determined as above indicated. This polymer was molded at 380° C. into tough film 5 mils thick. This film had a crystalline melting point of 371° C., and a glass transition temperature of 161° C. measured by differential thermal analysis and 159–161° C. measured on a penetrometer.

EXAMPLE 3

A copolyketone having a $T:I$ ratio of 70:30 was prepared by charging 123.06 g. (0.606 mol) of terephthaloyl chloride, 52.74 g. (0.260 mol) of isophthaloyl chloride and 1040 ml. of distilled hydrogen fluoride into an autoclave (interior surface plated with gold) of 2 liter capacity. The vessel was closed and cooled to 0° C., and 377 g. of boron trifluoride was charged into the vessel under 150 p.s.i. Then 148.70 g. (0.874 mol) of diphenyl ether was melted and injected into the vessel. While stirring at 200 r.p.m., the vessel was heated to 35° C. for 1 hr. The resulting deep red-purple solution was poured into aqueous ammonia, and the precipitated polymer was collected by filtration. The copolyketone polymer was washed in a blendor (high shear stirrer) with N,N-dimethylacetamide, then four times with water, and finally three times with methanol, and then it was dried under vacuum (low pressure nitrogen atmosphere) at 50° C. for 2 days. The copolyketone polymer had an inherent viscosity of 1.10, measured as a 0.5% by wt. solution in conc. sulfuric acid at 23° C.

Part of the above copolyketone polymer, 74 g., was combined with parts of the products of eight similar polymerization runs; the amounts and inherent viscosities of the other samples were as follows:

| Run: | Amount, grams | Inherent viscosity |
| --- | --- | --- |
| B | 4 | 1.05 |
| C | 2 | 1.00 |
| D | 9 | 1.04 |
| E | 8 | 1.03 |
| F | 100 | 1.05 |
| G | 197 | 0.88 |
| H | 11 | 0.84 |
| I | 4 | 1.17 |

For purposes of purifying it, the 409 g. of combined copolyketone polymer was stirred with 5441 g. (3480 ml.) of dichloroacetic acid for 4 days. The solution was a dark cherry red color. Then 20 ml. of triethylsilane was added as four 5-ml. portions at five minute intervals; with each addition the color became lighter, finally an orange-brown. After 1 hr., an additional 5 ml. of triethylsilane was added and stirring continued for 30 min.; the final color was orange. The polymer solution was poured slowly into distilled water and ice in a blendor. The precipitated white polymer was collected and soaked in 2.5 gal. of N,N-dimethylacetamide for 12 days. The polymer was again collected then washed three times in N,N-dimethylacetamide, three times in distilled water and three times in methanol. The polymer was dried under vacuum (low nitrogen pressure) at 50° C. for 2 days and at 200° C. for 2 days. The polymer had an inherent viscosity of 1.06, measured on a 0.5% by wt. solution in conc. sulfuric acid at 23° C.

The copolyketone resin was extruded into film form with a short-barrel ¾-in. extruder having a chromium plated screw and stainless steel barrel and die. The resin feed temperature was 117° C., barrel temperatures were 370 to 396° C., and the die temperature 372 to 385° C. The screw was run at 40 r.p.m., and the pressure ranged from 600 to 1300 p.s.i. Polymer throughput was 5 to 6 grams per minute. The extruded film was quenched by contacting with a metal drum at ambient room temperature. There was obtained 70 ft. of film having a thickness ranging from about 2 to about 4 mils and 100 ft. of film having a thickness ranging from about 4 to 10 mils. The inherent viscosity of the extruded copolyketone film structure ranged from 1.08 to 1.11, measured as a 0.5% by wt. solution in conc. sulfuric acid at 27° C. The film structure had a density of 1.269 g./cc., and X-ray data showed it to be amorphous, with a relative crystallinity index of 0. Calorimetry indicated a glass transition temperature of 165° C., crystallization at 219° C., and a crystalline melting point of 335–340° C. Other film properties are shown in Table I, Table II (tensile properties) and in Table III (electrical properties) below. The film was less than 1% soluble in "Arochlor" (thought to be mixed chlorinated biphenyls) at temperatures up to 150° C.

Samples of the above as-cast extruded film structure were held to ferrotype plates with magnets on all edges, and heat treated at 225° C. under nitrogen for 30 min. The resulting film structures were annealed, crystallized and heatset by this treatment, and were tough, flexible and slightly hazy. The density of the film structure was 1.295 g./cc., and the film had moderate crystallinity. Other properties are given in Table IV, Table V (tensile properties) and Table VI (electrical properties) below.

Additional samples of the above as-cast extruded film structure (mostly about 3 mils thick) were heat treated at 225° C., unrestrained, for various periods of time, in order to determine the optimum time period for crystallization at this temperature. Each sample was analyzed for its density and X-ray pattern. The results are given in Table VII below.

Further additional samples of the above as-cast extruded film structures were heat treated under restraint for 30 min. at various temperatures, in order to determine the optimum temperature for crystallization, annealing and heatsetting of this film. Each sample was analyzed for its density and X-ray pattern. The results are given in Table VIII below. It was concluded that 275° C. was the temperature for achieving maximum crystallinity.

TABLE I

| | |
|---|---:|
| Permeability $H_2O$, g./hr.–100 m.² (for 1 mil film) | 210 |
| Impact str. (kg.-cm./mil) | 2.1 |
| MIT fold | 12,300 |
| Tear str. (g./4.29 cm.-mil) | 30–60 |

TABLE II.—TENSILE PROPERTIES

| | Film thickness, 2.5 mils | | |
|---|---|---|---|
| Temperature (° C.) | Modulus (K p.s.i.) | Elongation (percent) | Tensile strength (K p.s.i.) |
| 23 | | 125 | 12.3 |
| 50 | 33 | 152 | 10.0 |
| 105 | 273 | 186 | 8.0 |
| 130 | 248 | 273 | 7.2 |
| 155 | 192 | 652 | 7.8 |
| 167 | 9.1 | 655 | 7.7 |
| 180 | 1.4 | 520 | 5.8 |
| 200 | 6.0 | 403 | 6.1 |
| 250 | 9.1 | 599 | 6.1 |

TABLE III.—ELECTRICAL PROPERTIES

| | Film Thickness, 4–5 mils | | |
|---|---|---|---|
| Temperature (° C.) | Volume resistivity (ohm-cm.) | K ($10^2/10^5$Hz.) | Dissipation factor ($10^2/10^5$Hz.) |
| 23 | $8 \times 10^{16}$ | 4.2/4.1 | 0.004/0.005 |
| 50 | $5 \times 10^{16}$ | 4.2/4.1 | 0.004/0.006 |
| 105 | $4 \times 10^{15}$ | 4.1/4.0 | 0.002/0.004 |
| 130 | $7 \times 10^{14}$ | 4.1/4.0 | 0.002/0.004 |
| 155 | $1 \times 10^{14}$ | 3.9/3.8 | 0.002/0.004 |
| 167 | $2 \times 10^{13}$ | 4.1/3.8 | 0.05/0.008 |
| 180 | $5 \times 10^{12}$ | 5.3/3.9 | 0.04/0.04 |
| 200 | $5 \times 10^{11}$ | 4.8/4.2 | 0.05/0.04 |
| 250 | $1 \times 10^{10}$ | 6.7/4.6 | 1.15/0.02 |

TABLE IV

| | |
|---|---:|
| MIT fold | 12,000 |

TABLE V.—TENSILE PROPERTIES

| | Film thickness, 2–3 mils | | |
|---|---|---|---|
| Temperature (° C.) | Modulus (K p.s.i.) | Elongation (percent) | Tensile strength (K p.s.i.) |
| 23 | 339 | 49 | 11.9 |
| 105 | 317 | 80 | 8.3 |
| 155 | 297 | 159 | 6.7 |
| 180 | 25 | 187 | 7.8 |
| 200 | 14 | 251 | 6.0 |
| 250 | 10 | 323 | 6.4 |

TABLE VI.—ELECTRICAL PROPERTIES

| | Film Thickness, 3–4 mils | | |
|---|---|---|---|
| Temperature (° C.) | Volume resistivity (ohm-cm.) | K ($10^2/10^5$Hz.) | Dissipation factor ($10^2/10^5$Hz.) |
| 23 | $8 \times 10^{16}$ | 4.4/4.3 | 0.004/0.005 |
| 50 | $6 \times 10^{16}$ | 4.3/4.3 | 0.003/0.004 |
| 105 | $8 \times 10^{15}$ | 4.3/4.2 | 0.002/0.004 |
| 130 | $3 \times 10^{15}$ | 4.3/4.2 | 0.002/0.004 |
| 155 | $4 \times 10^{14}$ | 4.3/4.2 | 0.002/0.004 |
| 167 | $2 \times 10^{14}$ | 4.3/4.3 | 0.005/0.004 |
| 180 | $1 \times 10^{13}$ | 5.2/4.4 | 0.04/0.01 |
| 200 | $3 \times 10^{11}$ | 5.9/5.0 | 0.05/0.04 |
| 250 | $1 \times 10^{10}$ | 7.9/5.6 | 0.86/0.01 |

TABLE VII

| Duration of heat treatment | Density, g./cc. | X-ray pattern |
|---|---|---|
| 0 | 1.269 | Amorphous. |
| 10 seconds | 1.269 | Do. |
| 30 seconds | 1.269 | Do. |
| 1 minute | 1.295 | Crystalline. |
| 5 minutes | 1.296 | Do. |
| 10 minutes | 1.281 | Do. |
| 30 minutes | 1.296 | Do. |
| 1 hour | 1.296 | Do. |
| 2 hours | 1.297 | Do. |
| 5 hours | 1.299 | Do. |
| 9 hours | 1.298 | Do. |
| 63 hours | 1.299 | Do. |

TABLE VIII

| Temperature of heat treatment, ° C. | Density, g./cc. | Relative crystallinity index |
|---|---|---|
| (None) | 1.269 | 0 |
| 150 | 2.270 | 0 |
| 175 | 1.269 | 0 |
| 200 | 1.269 | 0 |
| 225 | 1.294 | 20.6 |
| 250 | 1.295 | 28.5 |
| 275 | 1.297 | 42.5 |
| 300 | 1.295 | 24.7 |

EXAMPLE 4

A copolyketone having a T:I ratio of 70:30 was prepared from diphenyl ether, terephthaloyl chloride and isophthaloyl chloride in ortho-dichlorobenzene with aluminum chloride catalyst. After isolating and purifying the resulting copolyketone resin, it had an inherent viscosity of 0.81.

The above copolyketone resin was extruded into film form with a ¾ in. extruder and 4 in. die. The screw, barrel and die were chromium plated, and the breaker plate made of Hastelloy C. A filter pack of 50-, 100-, 150- and 250-mesh nickel wire screen was employed. Film was extruded with a barrel temperature range of 360–370° C., a die temperature of 370° C., and a screw speed of 50 r.p.m., at pressures of 550 to 700 p.s.i. The extruded film was quenched by contacting with a metal drum at ambient room temperature. There was obtained 100 ft. of film having a thickness ranging from about 1 to 2 mils and 15 ft. of film having a thickness ranging from about 4 to 10 mils. The film was clear and glossy. The inherent viscosity of the extruded film was 0.88. The film density was 1.271 g./cc. This as-cast extruded film was amorphous as shown by X-ray examination. Calorimetry indicated a glass transition temperature of 160±5° C., onset of crystallization at 216° C., and a crystalline melting point of 345–350° C.

A sample immersed in liquid nitrogen for 1 minute was not embrittled, but remained flexible. Other film properties are given in Tables IX to XI below.

Samples of the above as-cast extruded film (1 to 3 mils thick) were flattened by pressing at about 1 to 2 tons per square inch at 150° C. for 5 sec. The films were then clipped to frames and placed in an oven at 275° C. under nitrogen for 30 min. The resulting films were tough, flexible and hazy. The heat treatment accomplished annealing, crystallization and heat-setting. The X-ray pattern indicated high crystallinity. A sample immersed in liquid nitrogen for 1 minute was not embrittled, but remained flexible and creasible while immersed. The film density was 1.304 g./cc. Other film properties are given in Tables XII to XIV below.

Samples of the annealed film were examined for dimensional stability. For this purpose, strips 10 cm. long in the machine direction (direction of extrusion) and strips 5 cm. long in the transverse direction (perpendicular to direction of extrusion) (all strips 1 cm. wide) were heated at a given temperature for 30 min. with no restraint applied. The length after heating was measured, and the percent loss of length in that direction calculated. The results are given in Table XV below. Dimensional stability of this film up to at least 350° C. is excellent.

Additional samples of the above as-cast extruded film were heat-treated in a simulation of a continuous process. Samples of the film were placed on a pin-type tenter frame 3 in. wide and passed through an oven heated at 275° C. at such a rate that the film was heated for 30 min., under a nitrogen atmosphere. The resulting films were tough, flexible, opaque, smooth, and there were no tear-outs at the pins. The film was crystalline, 1.8 mils thick, and head a density of 1.301 g./cc. The machine direction tensile properties at 23° C. were: modulus, 435K p.s.i.; elongation, 27.7%; tensile strength, 12.7K p.s.i. The data show that these samples were annealed, crystallized, and heat-set.

TABLE IX

Permeability:
    $O_2$—97 cc./24 hr.-100 in.$^2$-atm. (for 1 mil)
    $H_2O$—169 g./hr.-100 m.$^2$ (for 1 mil)
Impact str. (kg.-cm./mil)—2.3
ZST (° C.)—250°
MIT fold—11,800/10,900 (MD/TD)
Tear str. (g./4.29 cm.-mil)—42/31 (MD/TD) Elmendorf

TABLE X.—TENSILE PROPERTIES

| | Film thickness (mils) 1–2 mils | | |
| --- | --- | --- | --- |
| Temperature (° C.) | Modulus (K p.s.i.) (MD/TD) | Elongation (percent) (MD/TD) | Tensile strength (K p.s.i.) (MD/TD) |
| 23 | 356/346 | 166/140 | 14.0/11.8 |
| 105 | 195/208 | 257/256 | 8.6/9.0 |
| 155 | 36/61 | 378/284 | 6.2/5.7 |
| 180 | 6/<6 | (¹) | 2.7/3 |
| 200 | 19/12.1 | 349.285 | 7.0/3.9 |
| 250 | 15/14 | 279/116 | 3.7/1.3 |

TABLE XI.—ELECTRICAL PROPERTIES

| | Film Thickness, 1.2 mils | | |
| --- | --- | --- | --- |
| Temperature (° C.) | Volume resistivity (ohm-cm.) | K ($10^2/10^5$Hz.) | Dissipation factor ($10^2/10^5$Hz.) |
| 23 | $2.2 \times 10^{17}$ | 3.5/3.4 | 0.003/0.006 |
| 105 | $2.5 \times 10^{15}$ | 3.4/3.3 | 0.002/0.005 |
| 155 | $4.4 \times 10^{13}$ | 3.4/3.3 | 0.003/0.005 |
| 167 | $2.8 \times 10^{13}$ | 3.7/3.4 | 0.05/0.01 |
| 180 | $1.3 \times 10^{13}$ | 5.1/3.6 | 0.05/0.04 |
| 200 | $5.7 \times 10^{12}$ | 4.4/3.8 | 0.03/0.04 |

TABLE XII

Permeability:
    $O_2$—45 cc./24 hr.-100 in.$^2$-atm. (for 1 mil)
    $H_2O$—75 g./hr.-100 m.$^2$ (for 1 mil)
Impact str. (kg.-cm./mil)—0.33
ZST (° C.)—325°
MIT fold—6000/3000 (MD/TD)
Tear str. (g./4.29 cm.-mil)—19/22 (MD/TD) Elmendorf

TABLE XIII.—TENSILE PROPERTIES

| | Film thickness (mils) 1.7 mil | | |
| --- | --- | --- | --- |
| Temperature (° C.) | Modulus (K p.s.i.) (MD/TD) | Elongation (percent) (MD/TD) | Tensile strength (K p.s.i.) (MD/TD) |
| 23 | 471/405 | 14/3 | 13.5/10.3 |
| 105 | 356/365 | 45/5 | 9.4/8.1 |
| 155 | 129/290 | 226/57 | 8.2/5.3 |
| 180 | 40/57 | 198/263 | 5.1/4.6 |
| 200 | 27/30 | 452/257 | 8.0/5.4 |
| 250 | 13/15 | 123/84 | 2.0/1.3 |

TABLE XIV.—ELECTRICAL PROPERTIES

| | Film Thickness, 1.7 mil | | |
| --- | --- | --- | --- |
| Temperature (° C.) | Volume resistivity (ohm-cm.) | K ($10^2/10^5$Hz.) | Dissipation factor ($10^2/10^5$Hz.) |
| 23 | $1.7 \times 10^{17}$ | 3.7/3.7 | 0.003/0.001 |
| 105 | $2.5 \times 10^{16}$ | 3.6/3.6 | 0.002/0.005 |
| 155 | $3.6 \times 10^{16}$ | 3.6/3.6 | 0.002/0.004 |
| 167 | $2.2 \times 10^{15}$ | 3.7/3.6 | 0.005/0.004 |
| 180 | $8.9 \times 10^{13}$ | 4.2/3.7 | 0.04/0.05 |
| 200 | $3.0 \times 10^{13}$ | 4.8/4.0 | 0.02/0.01 |
| 250 | $5.3 \times 10^{10}$ | 5.4/4.4 | 0.20/0.04 |

TABLE XV.—DIMENSIONAL STABILITY

| | Loss of length in— | |
| --- | --- | --- |
| Heating temperature, ° C. | Machine direction, percent | Transverse direction, percent |
| 150 | 0 | 0 |
| 175 | 0 | 0 |
| 200 | 0 | 0 |
| 225 | 0.5 | 0 |
| 250 | 1.5 | 0 |
| 275 | 1.0 | 0 |
| 300 | 1.0 | 0 |
| 325 | 1.0 | 0 |
| 350 | 1.0 | 0 |
| 375 | 6.5 | 0 |
| 395 | 10.0 | 0 |

EXAMPLE 5

Another batch of copolyketone having a T:I ratio of 70:30, prepared in the same manner as that of Example 2 and purified in a similar manner, was used for this example. It had an inherent viscosity of 0.82. This copolyketone was extruded into film in the same equipment and in the same manner as in Example 2, except that the pressure range was 350 to 450 p.s.i. There was obtained 55 ft. of film having a thickness ranging from about 1 to 3 mils and 25 ft. of film having a thickness ranging from about 5 to 8 mils. The film was clear, glossy, tough and flexible. The inherent viscosity of the extruded film was 0.87.

Samples of the above as-cast extruded film were clamped to metal frames and heat treated at 275° C. under nitrogen for 30 min. The films were annealed, crystallized and heat-set by this treatment, and were tough, flexible and cloudy.

EXAMPLE 6

A copolyketone having a T:I ratio of 80:20 (prepared from diphenyl ether, terephthaloyl chloride and isophthaloyl chloride in ortho-dichlorobenzene with aluminum chloride catalyst; inherent viscosity 0.86) was extruded into film with a vertical ¾-inch screw extruder. The polymer was preheated at 200° C., the main barrel temperature was 385° C., the die lips 390 to 400° C., and the barrel pressure 490 to 500 p.s.i. The film obtained was 1 to 5 mils thick, transparent, tough and flexible, and had an inherent viscosity of 0.95 (0.5% by wt. in conc. sulfuric acid at 23° C. The film had a density of 1.269 g./cc. Both X-ray and calorimetry data indicated it to be amorphous. Calorimetry measurements showed a glass transition temperature of 165–170° C., crystallization at 210° C., and a crystalline melting point of 365–370° C. Other film properties are shown in Table XVI, Table XVII (tensile properties), and Table XVIII (electrical properties) below.

Samples of the above as-cast extruded film were clamped to frames and heat treated in an oven under low nitrogen pressure at 225° C. for 30 min.; the heat was cut off and the samples permitted to cool in the oven to room temperature over a 3.5-hour period. The films were annealed, crystallized and heat set by this treatment. Calorimetry and X-ray data indicated the film to be crystalline. The film had a density of 1.297 g./cc. Tensile properties are given in Table XIX.

TABLE XVI

Impact str. (kg.-cm./mil) _____ 0.5
MIT fold _____ 7000
Tear str. (g./4.29 cm.-mil) _____ 22

TABLE XVII.—TENSILE PROPERTIES

| Temperature (° C.) | Modulus (K p.s.i.) | Elongation (percent) | Tensile strength (K p.s.i.) |
|---|---|---|---|
| 23 | 298 | 99 | 10.3 |
| 50 | 204 | 125 | 5.6 |
| 105 | 152 | 147 | 4.0 |
| 155 | 78 | 516 | 5.8 |
| 180 | 1.7 | 492 | 2.8 |
| 200 | 12.3 | 355 | 4.9 |

TABLE XVIII.—ELECTRICAL PROPERTIES

| Temperature (° C.) | Volume resistivity (ohm-cm.) | K ($10^2/10^5$Hz.) | Dissipation factor ($10^2/10^5$Hz.) |
|---|---|---|---|
| 23 | $2\times10^{16}$ | 3.9/3.8 | 0.003/0.006 |
| 100 | $1.5\times10^{15}$ | 3.8/3.7 | 0.004/0.004 |
| 155 | $4\times10^{13}$ | 3.8/3.7 | 0.006/0.003 |
| 180 | $1.5\times10^{11}$ | 5.4/3.9 | 0.11/0.03 |
| 200 | $1\times10^{11}$ | 5.1/4.0 | 0.16/0.03 |

TABLE XIX
Tensile properties

Temp. (°C.) _____ 23
Modulus (K p.s.i.) _____ 249
Elongation (percent) _____ 6
Tensile str. (K p.s.i.) _____ 8.3

EXAMPLE 7

A copolyketone having a T:I ratio of 60:40 (prepared from diphenyl ether, terephthaloyl chloride and isophthaloyl chloride in ortho-dichlorobenzene with aluminum chloride catalyst; inherent viscosity 0.77; melt index at 350° C. after holding at 350° C. for 5 minutes, 32) was extruded into film with a vertical, short-barrel, ¾-inch-screw extruder having a chromium-plated barrel, screw and die. The polymer was preheated at 300° C., the main barrel temperature was 342–353° C., the die 352–353° C., the barrel pressure 150 to 200 p.s.i., and the screw run at 40 r.p.m. The film was tough, flexible, glossy and had an inherent viscosity of 0.83 (0.5% by weight in conc. sulfuric acid at 23° C.). The film obtained was 3 to 9 mils thick, and had a density of 1.273 g./cc. The film was amorphous, as shown by X-ray data. Calorimetry measurements showed a glass transition temperature of 163° C., crystallization at 221° C., and a crystalline melting point of ca. 325° C. Other film properties are shown in Table XX, Table XXI (tensile properties), and in Table XXII (electrical properties) below. The film was less than 1% soluble in "Arochlor" on soaking for 24 hours at temperatures up to 150° C.

Samples of the above as-cast extruded film were mounted on frames under restraint and placed in an oven at 250° C. for 30 minutes. The films were annealed, crystallized and heat-set by this treatment; they became somewhat hazy and opaque, but were still tough and flexible. The films were crystalline, as shown by X-ray data. The film density was 1.304 g./cc. Tensile properties are shown in Table XXIII and electrical properties in Table XXIV below.

TABLE XX

Impact str. (kg.-cm./mil) _____ 0.8
MIT fold _____ 221

TABLE XXI.—TENSILE PROPERTIES

Film thickness, 3.5–2.6 mils

| Temperature (° C.) | Modulus (K p.s.i.) | Elongation (percent) | Tensile strength (K p.s.i.) |
|---|---|---|---|
| 23 | 294 | 58 | 8.8 |
| 50 | 313 | 17 | 7.1 |
| 105 | 139 | 149 | 4.7 |
| 130 | 106 | 568 | 4.7 |
| 155 | 64 | 686 | 1.9 |
| 167 | 0.2 | >1,000 | 1.0 |
| 180 | 0.4 | 423 | 0.02 |
| 200 | 5.7 | 89 | 0.9 |

TABLE XXII.—ELECTRICAL PROPERTIES

Film Thickness, 5.5 mils

| Temperature (° C.) | Volume resistivity (ohm-cm.) | K ($10^2/10^5$Hz.) | Dissipation factor ($10^2/10^5$Hz.) |
|---|---|---|---|
| 23 | $4.5\times10^{16}$ | 3.9/3.8 | 0.004/0.010 |
| 50 | $3.1\times10^{16}$ | 4.1/3.8 | 0.003/0.008 |
| 105 | $7.6\times10^{15}$ | 3.8/3.7 | 0.003/0.006 |
| 130 | $2.3\times10^{15}$ | 3.8/3.8 | 0.004/0.006 |
| 155 | $3.1\times10^{14}$ | 3.9/3.8 | 0.008/0.005 |
| 167 | $6.0\times10^{12}$ | 4.7/3.9 | 0.085/0.014 |
| 180 | $2.1\times10^{11}$ | 5.9/4.1 | 0.090/0.055 |
| 200 | $1.2\times10^{11}$ | 6.1/4.8 | 0.15/0.06 |
| 250 | $4.7\times10^{9}$ | 7.6/5.5 | 0.94/0.04 |

TABLE XXIII—TENSILE PROPERTIES

Film thickness, 3.4–3.8 mils

| Temperature (° C.) | Modulus (K p.s.i.) | Elongation (percent) | Tensile strength (K p.s.i.) |
|---|---|---|---|
| 23 | 367 | 43 | 12.3 |
| 50 | 365 | 44 | 10.3 |
| 105 | 377 | 44 | 8.8 |
| 130 | 366 | 152 | 6.9 |
| 155 | 286 | 335 | 6.3 |
| 167 | 44 | 442 | 6.9 |
| 180 | 23 | 515 | 7.0 |
| 200 | 17 | 573 | 5.5 |
| 250 | 9 | 1,148 | 4.9 |

TABLE XXIV.—ELECTRICAL PROPERTIES

Film thickness, 3.8 mils

| Temperature (° C.) | Volume resistivity (ohm-cm.) | K ($10^2/10^5$Hz.) | Dissipation factor ($10^2/10^5$Hz.) |
|---|---|---|---|
| 23 | $1.0\times10^{17}$ | 4.4/4.3 | 0.005/0.005 |
| 50 | $8.9\times10^{16}$ | 4.3/4.2 | 0.004/0.004 |
| 105 | $4.3\times10^{16}$ | 4.3/4.2 | 0.003/0.004 |
| 130 | $1.8\times10^{15}$ | 4.3/4.2 | 0.001/0.005 |
| 155 | $3.2\times10^{14}$ | 4.3/4.2 | 0.002/0.004 |
| 167 | $6.2\times10^{13}$ | 4.4/4.2 | 0.020/0.007 |
| 180 | $8.7\times10^{12}$ | 5.4/4.4 | 0.045/0.019 |
| 200 | $4.7\times10^{11}$ | 6.2/5.1 | 0.034/0.053 |
| 250 | $1.7\times10^{11}$ | 7.3/6.0 | 0.51/0.01 |

EXAMPLE 8

A copolyketone resin having a *T:I* ratio of 50:50 was prepared from diphenyl ether, terephthaloyl chloride and isophthaloyl chloride in ortho-dichlorobenzene with aluminum chloride catalyst. After isolation and purification it had an inherent viscosity of 0.81 (0.5% by weight solution in conc. sulfuric acid at 23° C.). This copolyketone resin was extruded into film with a ¾-inch extruder having a chromium-plated barrel, screw and die. The main barrel temperature was 340–347° C., the die lips 320–326° C., the barrel pressure ranged from 500 to 1200 p.s.i., and the screw speed 50 r.p.m. The film was tough and flexible. It was 0.7 to 12 mils thick and had an inherent viscosity of 0.85. The film density was 1.2728 g./cc.

Samples of the above as-cast extruded film were clamped to frames and heated in an oven at 225° C. for 30 minutes. The films were annealed, crystallized and heat-set by this treatment, and were tough, flexible and hazy. The film density was 1.2958 g./cc.

What is claimed is:

1. A film structure of a crystalline copolyketone consisting essentially of the following repeating structural unit:

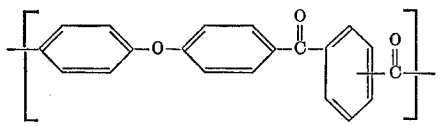

wherein the

moiety is either

or

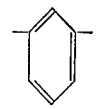

(I)

and the *T:I* ratio varies from 90:10 to 50:50.

2. The crystalline copolyketone film structure of claim 1 which is heat-set and dimensionally stabilized and characterized by substantially no shrinkage upon heating up to a temperature of about 200° C.

3. The crystalline copolyketone film structure of claim 1 having a zero strength temperature above 300° C.

4. The crystalline copolyketone film structure of claim 2 having a zero strength temperature above 300° C.

5. The crystalline copolyketone film structure of claim 1 having an oxygen permeability of less than about 50 cc./24 hr.-100 in.$^2$-atm.-mil of thickness.

6. The crystalline copolyketone film structure of claim 5 having a water vapor permeability of less than about 75 g./hr.-100 m.$^2$-mil of thickness.

7. The crystalline copolyketone film structure of claim 2 having an oxygen permeability of less than about 50 cc./24 hr.-100 in.$^2$-atm.-mil of thickness.

8. The crystalline copolyketone film structure of claim 7 having a water vapor permeability of less than about 75 g./hr.-100 m.$^2$-mil of thickness.

References Cited
UNITED STATES PATENTS

| | | | |
|---|---|---|---|
| 3,065,205 | 11/1962 | Bonner | 260—63 |
| 3,324,199 | 6/1967 | Tocker | 260—857 |
| 3,385,825 | 5/1968 | Goodman et al. | 260—61 |
| 3,516,966 | 6/1970 | Berr | 260—47 |

WILLIAM H. SHORT, Primary Examiner

L. L. LEE, Assistant Examiner

U.S. Cl. X.R.

260—61; 264—176 R, 346

PO-1050
(5/69)

UNITED STATES PATENT OFFICE
CERTIFICATE OF CORRECTION

Patent No. 3,637,592          Dated January 25, 1972

Inventor(s)      Charles E. Berr

It is certified that error appears in the above-identified patent and that said Letters Patent are hereby corrected as shown below:

Column 3, line 69, "ahve" should read --have--.
Column 7, line 69, in the "Modulus (K p.s.i.)" column --303-- should be inserted.
Column 7, line 70, in the "Modulus (K p.s.i.)" column, "33" should read --339--.
Column 9, line 75, "$^{(1)}$high(off scale)" should be inserted as a footnote.
Column 10, line 21, "1.7" should read --1-2--.
Column 10, Table XIV, the "Dissipation factor ($10^2/10^5$Hz.)" column should read as follows:

0.003/0.005
         0.002/0.004
         0.002/0.004
         0.005/0.005
         0.04/0.01
         0.02/0.04
         0.20/0.01

Column 12, line 24 "3.5-2.6" should read --3.5-6.6--.

Signed and sealed this 5th day of September 1972.

(SEAL)
Attest:

EDWARD M. FLETCHER, JR.
Attesting Officer

ROBERT GOTTSCHALK
Commissioner of Patents